United States Patent [19]

Tsubota et al.

[11] Patent Number: 4,849,318

[45] Date of Patent: Jul. 18, 1989

[54] PROCESSES FOR PRODUCING ELECTROPHOTOGRAPHIC TONER

[75] Inventors: Noriaki Tsubota, Himeji; Toshiro Tokuno, Nishinomiya, both of Japan

[73] Assignee: Mita Industrial Co., Ltd., Osaka, Japan

[21] Appl. No.: 114,593

[22] Filed: Oct. 30, 1987

[30] Foreign Application Priority Data

Oct. 31, 1986 [JP] Japan ................................. 61-258325
Nov. 29, 1986 [JP] Japan ................................. 61-283082

[51] Int. Cl.⁴ .............................................. G03G 9/08
[52] U.S. Cl. .................................... 430/137; 524/904; 525/934; 526/934
[58] Field of Search ....................... 430/137; 524/904; 525/934; 526/934

[56] References Cited

U.S. PATENT DOCUMENTS 4,617,249 10/1986 Ober et al. .......................... 430/137
4,659,641 4/1987 Mahalek et al. .................... 430/137

FOREIGN PATENT DOCUMENTS 57-53756 3/1982 Japan .................................. 430/137
57-154253 9/1982 Japan .................................. 430/137
60-57856 4/1985 Japan .................................. 430/137

*Primary Examiner*—Roland E. Martin
*Attorney, Agent, or Firm*—Sherman and Shalloway

[57] ABSTRACT

A process for producing an electrophotographic toner in one step by suspension polymerization of monomers capable of forming a fixing resin. In a first embodiment, the suspension polymerization is carried out in the presence of a specific suspension stabilizer and a radical polymerization initiator. In a second embodiment, the suspension polymerization is carried out while applying ultrasonic radiation of a fixed frequency. The process gives a toner having a uniform particle size distribution.

3 Claims, 1 Drawing Sheet

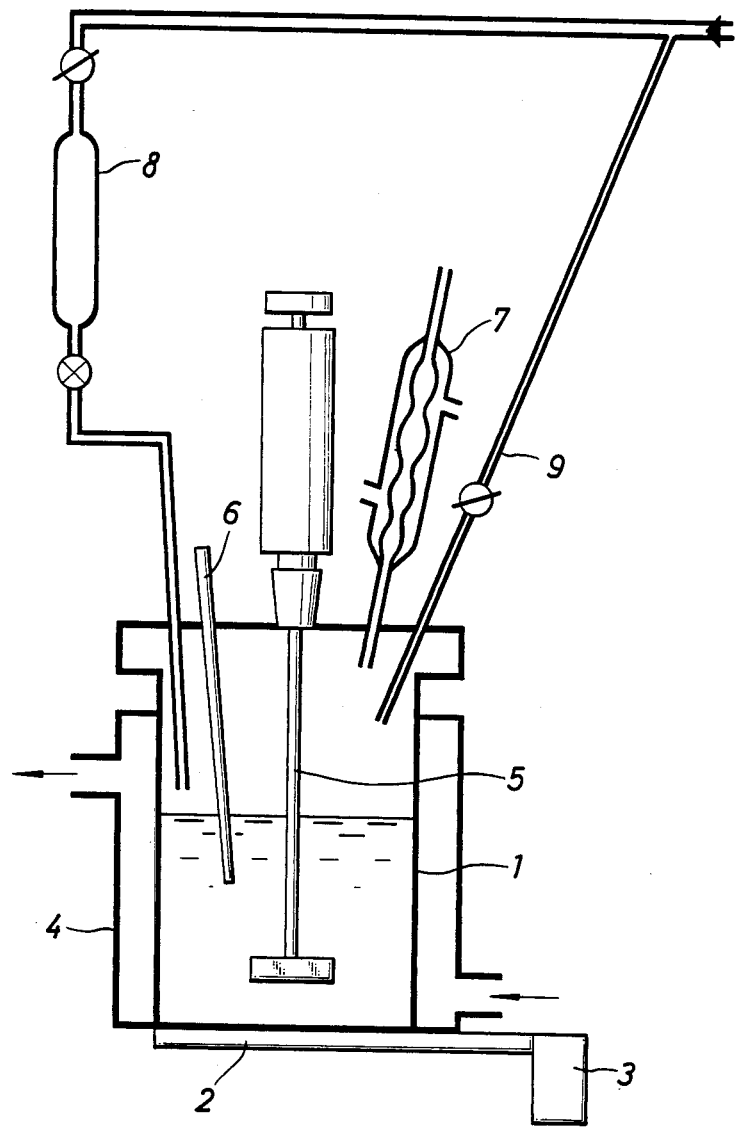

PROCESSES FOR PRODUCING ELECTROPHOTOGRAPHIC TONER

BACKGROUND OF THE INVENTION

1. Field of the Invention

This invention relates to processes for producing an electrophotgraphic toner, and more specifically, to processes for producing a toner containing a coloring agent and having a suitable particle diameter and a uniform particle size distribution in one step by polymerizing monomers capable of forming a fixing resin in suspension.

2. Description of the Prior Art

In electrophotography, a toner is used to develop a latent electrostatic image to a visible toner image. The toner particles are composed of a composition comprising a resin medium and a coloring agent and as required, a charge controlling agent and other additives and having a certain particle diameter range of, for example, 1 to 30 $\mu$m. Resins having the desired chargeability and bindability, such as styrene-type resins, are used as the resin medium, and carbon blacks and other organic or inorganic colored pigments are used as the coloring agent.

Most typically, electrophotographic toners are produced by a process which comprises melt-kneading the resin medium and the coloring agent, cooling and pulverizing the resulting melt-kneaded composition, and classifying the pulverized particles to adjust their size to a fixed range. The yield of the toners obtained by pulverization and classification, however, is low, and much equipment is required for these operations. Hence, the cost of producing toners is very high. Furthermore, since the resulting toner particles have irregular shapes, their flowability is generally low and blocking tends to occur.

Many proposals have previously been made to produce toners directly in a step of forming a toner resin by polymerization. A typical example is a process whch comprises dissolving a soluble polymerization initiator in a water-insoluble monomer, adding additives such as a coloring agent, suspending the resulting composition in an aqueous solution containing a suitable dispersing agent, such as a water-soluble polymer, an inorganic powder or a surface-active agent, with stirring under high shear, and polymerizing the suspended monomer particles to produce colored polymer particles.

In this suspension polymerization process, the size of the final toner particles is determined by the state of suspension of the monomeric composition in water: The distribution of the sizes of the particles is very broad because of the state of putting the monomeric composition in water and agitating it, and it is difficult to obtain toner particles having a single particle diameter. Furthermore, this suspension polymerization process only gives coarse particles having a particle diameter of several tens of $\mu$m to several mm, and it is difficult to obtain particles having a size of 1 to 30 $\mu$m which are useful as a developing toner. Of course, the particle size of the resulting toner can be rendered fine by increasing the amount of the dispersing agent incorporated. In this case, the dispersing agent is included in the toner, and the toner is liable to be sensitive to humidity and have degraded electrophotographic properties. To prevent this, a special after-treatment operation is necessary and the number of the required steps is too many to be practical.

The problem of the toners obtained by the suspension polymerization process is that the inclusion of a certain proportion of fine particles is difficult to avoid, and their particle size is non-uniform. Such fine particles are particles of the polymer itself not containing toner additives such as the coloring agent. Since such fine particles have different characteristics from the toner particles, they become a cause of toner scattering or fogging during development even when their amount is small. Such fine particles also tend to reduce the flowability of the toner particles. Even if such fine particles can be removed, the resulting toner particles have a greatly different composition form that initially formulated. The desired electrophotographic properties cannot be obtained, and the reduced yield of the toner particles leads to the increased cost of production.

SUMMARY OF THE INVENTION

It is an object of this invention therefore to provide a process for producing an electrophotographic toner by suspension polymerization, which is free form the various defects of the conventional processes for producing electrophotographic toners.

Another object of this invention is to provide a process for producing an electrophotographic toner, by which a colored resin having a particle size suitable for use as a toner and a uniform particle size distribution and being substantially free from inhibitory factors on the electrophotographic properties of the toner can be produced directly in a step of producing the resin by polymerization.

Still another object of this invention is to provide a process for producing an electrophotographic toner, in which the particle diameter of the colored resin is controlled during the polymerization step stably to a range of 1 to 30 $\mu$m suitable as a toner, the particle size distribution of the toner is maintained uniform, and the inclusion of fine particles is circumvented.

In a first embodiment, the present invention provides a process for producing electrophotographic colored toner particles which comprises suspending at least one monomer capable of forming a fixing resin and a coloring agent in water and polymerizing the suspended monomer particles in the presence of a radical initiator, wherein said radical initiator has a solubility in water at 25° C. of not more than 0.05 g/100 cc and the suspension polymerization is carried out in the presence of a surface-active agent, as a suspension stabilizer, in a concentration lower than the critical micelle concentration.

In a second embodiment, the present invention provides a process for producing colored toner particles which comprises suspending at least one monomer capable of forming a fixing resin and a coloring agent in water and polymerizing the suspended monomer particles in the presence of a radical initiator, wherein the suspension polymerization is carried out while ultrasonic radiation with a frequency of 10 to 90 KHz is applied to the polymerization system to maintain the suspended particles fine.

BRIEF DESCRIPTION OF THE DRAWING

FIG. 1 is a view showing a suspension polymerization apparatus for conveniently performing the process of this invention in the second embodiment.

DETAILED DESCRIPTION OF THE PREFERRED EMBODIMENT

In suspension polymerization, a monomer is suspended in water by a suspension stabilizer and polymerized in the presence of a radical polymerization initiator dissolved in the monomer. Inorganic fine powders, water-soluble polymeric protective colloids and surface-active agents, for example, are known as the suspension stabilizer. These stabilizers have their own advantages and disadvantages in regard to the controlling of the particle size of resin particles formed by polymerization. The inorganic fine powders and protective colloids are not fully satisfactory in their ability to stablize the suspension, and the resulting resin particles have a large particle diameter and their particle size distribution tends to be very broad. The surface-active agents have the excellent ability to stabilize the suspension, but inevitably tend to emulsify part of the monomer, and the inclusion of emulsion-polymerized particles having a small particle diameter in the suspension-polymerized particles cannot be avoided.

PROCESS IN THE FIRST EMBODIMENT

In the process of this invention in the first embodiment, the use of a combination of a surface-active agent having a lower concentration than the critical micelle concentration as a suspension stabilizer and a radical initiator having a solubility in water at 25° C. of not more than 0.05 g/100 enables the suspension-polymeried particles to have a uniform particle size suitable for a toner and prevents the inclusion of fine polymer particles.

In the first embodiment, the use of the surface-active agent is essential in order to control the particle size of the suspension-polymerized particles to one suitable for a toner and render their particle size distribution uniform. In order to prevent the inclusion of the emulsified polymer particles, however, it is first necessary to use the surface-active agent in a lower concentration than the critical micelle concentration. The surface-active agent has the property of being ionized into long-chain ions (anions) and counterions when its concentration is sufficiently low, but when its concentration is above a certain fixed concentration, i.e. the critical micelle concentration, the long-chain ions together to form a micelle and become colloid ions. In the present invention, the formation of colloid ions, namely the formation of emulsified particles of the monomer, is prevented by using the surface-active agent in a lower concentration than the critical micelle concentration.

Investigations of the present inventors have shown that only the use of the surface-active agent in a lower concentration than the critical micelle concentration in suspension polymerization is insufficient for avoiding the inclusion of emulsion-polymerized particles having a fine particle diameter. In order to prevent the inclusion of the emulsion-polymerized particles completely, the use of a radical polymerization initiator having a solubility in water at 25° C. of not more than 0.50 g/100 cc is a second essential condition.

The reason why the inclusion of the emulsionpolymerized particles is prevented by using the specific radical polymerization initiator in this invention is presumably as follows: In the suspension polymerization system, the monomer dissolved in water is present although its amount may vary. The monomer dissolved in water begins to be polymerized by the radical polymerization initiator dissolved in water. The resulting polymer radicals form a nucleus and the monomer dissolved in water is absorbed by the nucleus and grows to the emulsion-polymerized polymer particle size. In contrast, according to this invention, the initiation of the polymerization of the monomer dissolved in water is inhibited by adjusting the solubility in water of the radical initiator to below the aforesaid standard value. Hence, the formation of the fine polymer particles is inhibited.

PROCESS IN THE SECOND EMBODIMENT

The invention of the process in the second embodiment is based on the discovery that when ultrasonic radiation with a frequency of 10 to 90 KHz is applied to the suspension polymerization system, the particles of the toner particles formed by the polymerization are controlled to a particle diameter range suitable for development in electrophotography, and at the same time, the particle size distribution of the toner particles becomes relatively uniform, and that by the ultrasonic radiation, the adhesion of the resin to the polymerization vessel, etc. can be effectively prevented.

It was previously known from Hatate, et al. Chem. Eng. Commun., vol. 34, pages 325–333, 1985 that suspension polymerization may be carried out under ultrasonic irradiation. This paper states that when styrene is suspension-polymerized under irradiation of ultrasonic waves with a frequency of 200 to 800 KHz, the size of the suspended particles increases owing to the agglomeration effect as compared with the case of not irradiating ultrasonic waves.

In the second embodiment of the invention, application of ultrasonic radiation with a frequency of 10 to 90 KHz, preferably 15 to 50 KHz, especially preferably 20 to 30 KHz, makes it possible to control the particle diameter of the suspended particles to finer particle sizes than in the absence of ultrasonic radiation. This is an unexpected action of the second embodiment of the process of this invention.

The mechanism of this action has not yet been elucidated. The effect of coalescing and agglomerating the suspended particles and the effect of dividing and dispersion the particles finely are conceivable as the effects of vibrations created by applying ultrasonic radiation to the suspended particles. Under the conditions in this invention, the latter effect appears to be produced.

STARTING MATERIALS

(A) Monomers

The monomer used in the first and second embodiments of the process of this invention is radicalpolymerizable, and gives a polymer having both fixability and chargeability required of a toner. At least one ethylenically unsaturated monomer is used. Examples of suitable monomers are monovinyl aromatic monomers, acrylic monomers, vinyl ester monomers, vinyl ether monomers, diolefin monomers and monoolefin monomers.

The monovinyl aromatic monomers are, for example, monovinyl aromatic hydrocarbons of the formula

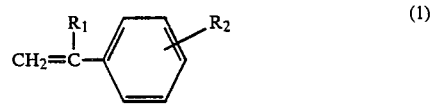

wherein $R_1$ represents a hydrogen atom, a lower alkyl group, or a halogen atom, and $R_2$ represents a hydrogen atom, a lower alkyl group, a halogen atom, an alkoxy group, an amino group, a nitro group, a vinyl group, or a carboxyl group.

Specific examples include, styrene, alpha-methylstyrene, vinyltoluene, alpha-chlorostyrene, o-, m- or p-chlorostyrene, p-ethylstyrene, sodium styrenesulfonate and divinylbenzene. They may be used single or in combination.

Examples of the other monomers mentioned above are as follows:

Acrylic monomers of the formula $$CH_2=\underset{R_3}{\underset{|}{C}}-CO-O-R_4 \qquad (2)$$

wherein $R_3$ represents a hydrogen atom or a lower alkyl group, and $R_4$ represents a hydrogen atom, a hydrocarbon group having up to 12 carbon atoms, a hydrooxyalkyl group, a vinyl ester group or an aminoalkyl group.

Specific examples include acrylic acid, methacrylic acid, methyl acrylate, ethyl acrylate, butyl acrylate, 2-ethylhexyl acrylate, cyclohexyl acrylate, phenyl acrylate, methyl methacrylate, hexyl methacrylate, 2-ethylhexyl methacrylate, ethyl beta-hydroxyacrylate, propyl gamma-hydroxyacrylate, butyl deltahydroxyacrylate, ethyl beta-hydroxymethacrylate, propyl gamma-aminoacrylate, propyl gamma-N,N'-diethylaminoacrylate, esters of ethylene glycol dimethacrylic acid and esters of tetraethylene glycol dimethacrylic acid.

Vinyl esters of the formula $$CH_2=CH \atop | \atop O-C-R_5 \atop \| \atop O \qquad (3)$$

wherein $R_5$ represents a hydrogen atom or a lower alkyl group.

Specific examples include vinyl formate, vinyl acetate and vinyl propionate.

Vinyl ethers of the formula $$CH_2=CH \atop | \atop O-R_6 \qquad (4)$$

wherein $R_6$ represents a monovalent hydrocarbon group having up to 12 carbon atoms.

Specific examples include vinyl methyl ether, vinyl ethyl ether, vinyl n-butyl ether, vinylphenyl ether and vinyl cyclohexyl ether.

Diolefins of the formula $$CH_2=\underset{R_7}{\underset{|}{C}}-\underset{R_8}{\underset{|}{C}}=CH-R_9 \qquad (5)$$

wherein each of $R_7$, $R_8$ and $R_9$ represents a hydrogen atom, a lower alkyl group or a halogen atom.

Specific examples are butadiene, isoprene and chloroprene.

Monoolefins of the formula $$CH_2=\underset{R_{10}}{\underset{|}{C}}-R_{11} \qquad (6)$$

wherein each of $R_{10}$ and $R_{11}$ represents a hydrogen atom or a lower alkyl group.

(B) Coloring agents (colored pigments)

Examples of suitable colored pigments are shown below.

Black pigments

Carbon black, acetylene black, lamp black, and aniline black.

Yellow pigments

Chrome yellow, zinc yellow, cadmium yellow, yellow iron oxide, mineral fast yellow, nickel titanium yellow, Naple's Yellow, Naththol Yellow S, Hansa Yellow G, Hansa Yellow 10G, Benzidine Yellow G, Benzidine Yellow CR, Quinoline Yellow Lake, Permanent Yellow NCG, and Tartrazine Lake.

Orange pigments

Chrome orange, molybdenum orange, Permanent Orange GTR, Pyrazolo Orange, Vulcan Orange, Indanthrene Brilliant Orange RK, Benzidine Orange G and Indanthrene Brilliant Orange GK.

Red pigment

Red iron oxide, cadmium red, red lead, cadmium mercury sulfide, Permanent Red 4R, Lithol Red, Pyrazolo Red, Watchung Red calcium salt, Lake Red D, Brilliant Carmine 6B, Eosine Lake, Rhohdamine Lake B, Alizarin Lake and Brilliant Carmine 3B.

Violet pigments

Manganese violet, Fast Violet B, and Methyl Violet Lake.

Blue pigments

Prussian blue, cobalt blue, Alkali Blue Lake, Victoria Blue Lake, Phthalocyanine Blue, Metal-Free Phthalocyanine Blue, a partially chlorinated product of Phthalocyanine Blue, Fast Sky Blue and Indanthrene Blue BC.

Green pigments

Chrome green, chromium oxide, Pigment Green B, Malachite Green Lake, and Fanal Yellow Green G.

White pigments

Zinc flower, titanium dioxide, antimony white and zinc sulfide.

Body extender pigments

Baryte powder, barium carbonate, clay, silica, white carbon, talc and alumina white.

(C) Magnetic pigments

Known magnetic material pigments include, for example, $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O_{19}$, $NdFeO_3$, $BaFe_{12}O_{19}$, $MgFe_2O_4$, $MnFe_2O_4$, $LaFeO_3$, Fe powder, Co powder and Ni powder. In this invention, fine powders of these known magnetic materials may be used.

(D) Additives

In the present invention, additive components other than the coloring agents, which are desirable included in the toner can be incorporated in the polymerization system prior to polymerization.

For example, for use as a two-component pigment, a known charge controlling agent, for example oil-soluble dyes such as Nigrosine Base (CI5045), Oil Black (CI 26150), and Spiron Black, metal naphthenates, fatty acid metal soaps and resin acid soaps, may be incorporated. To impart an offset preventing effect to the toner, it is possible to include a release agent such as low-molecular-weight polyethylene or polypropylene, various waxes, and silicone oils.

(E) Suspension stabilizers

In the process of this invention, the aforesaid starting materials are suspended in water. To stabilize the state of suspension in water, an organic or inorganic dispersing agent is generally used. In the first embodiment, a surface-active agent, particularly an anionic surface-active agent, is advantageously used. Non-limitative examples of suitable surface-active agents include fatty acid salts such as sodium oleate and potassium castor oil soap; higher alcohol sulfuric acid ester salts such as sodium laurylsulfate and sodium cetylsulfate; alkylarylsulfonic acid salts such as sodium dodecylbenzenesulfonate; sodium alkylnaphthalenesulfonates and a sodium salt of a betanaphthalenesulfonic acid/formaldehyde condensate; derivatives of naphthalenesulfonic acid salts; dialkylsulfonsuccinic acid salts; dialkylphosphoric acid salts; polyoxyethylene alkyl ether sulfuric acid salts; polyoxyethylene alkyl ether sulfuric acid triethanolamines; and polyoxyethylene alkyl phenol ether sulfuric acid salts.

These surface-active agents may be used in combination with inorganic dispersants to be described below.

In the second embodiment of the process of this invention, there can also be used, either singly or in combination, organic dispersants, for example gelatin, starch, water-soluble starch derivative, water-soluble cellulose derivative such as carboxymethyl cellulose, water-soluble polymers such as polyvinyl alcohol, watersoluble acrylic resins and vinyl ether/maleic acid copolymer, and anionic, nonionic, cationic and amphoteric surface-active agents and inorganic dispersants such as tricalcium phosphate, talc, bentonite, kaolin, titanium oxide, alumina, zinc flower, aluminum hydroxide, magnesium hydroxide, basic magnesium silicate, titanium hydroxide, ferric hydroxide, barium sulfate, silica, magnesium carbonate and calcium carbonate.

As the inorganic dispersants, fine powders having a particle diameter of 0.001 to 5 $\mu$m are especially advantageously used.

(F) Radical polymerization initiator

The radical polymerization initiator used in the first embodiment should have a solubility in water at 25° C. of not more than 0.05 g/100 cc. Many of hydroperoxides such as cumene hydroperoxide and azobis compounds such as dimethyl-2,2'-azobisisobutyrate, which are used in ordinary suspension polymerization, do not meet this requirement. Non-limitative examples of suitable radical initiators that can be used in the first embodiment include lauryl peroxide, benzoyl peroxide, 2,2'-azobis-2,4-dimethylvaleronitrile, 1-phenylethylazodiphenylmethane and 2,2'-azobis-2,4-trimethylpentane.

The radical polymerization initiator used in the second embodiment is soluble in monomers. Examples are azo compounds such as azobisisobutyronitrile and peroxides such as cumene hydroperoxide, t-butyl hydroperoxide, benzoyl peroxide and lauroyl peroxide.

POLYMERIZATION PROCESSES

According to this invention, the monomer capable of forming a fixing resin and the coloring agent and as required, toner additives are suspended in water in the presence of the suspension stabilizer, and the monomer is suspension-polymerized in the presence of the radical polymerization initiator.

The amount of the monomer to be charged is desirably 5 to 200 parts by weight, preferably 10 to 100 parts by weight, per 100 parts by weight of the aqueous medium.

The coloring agent is incorporated in an amount sufficient to be included in the toner resin. Its suitable amount is generally 1 to 30% by weight, preferably 3 to 20%, based on the amount of the monomer charged. When a magnetic material is used as the pigment, its suitable amount is generally 5 to 30% by weight, preferably 10 to 250% by weight, based on the amount of the monomer charged.

Preferably, the suspension stabilizer (surface-active agent) used in the first embodiment is added in water in a concentration lower than the critical micelle concentration, generally in a concentration 50 to 100% of the critical micelle concentration. When the inorganic power is used in combination, the concentration of the inorganic powder in the aqueous medium is desirable 0.01 to 50% by weight, preferably 0.1 to 10% by weight.

The amount of the suspension stabilizer used in the second embodiment varies depending upon its type. The water-soluble polymeric dispersant is used preferably in an amount of 0.1 to 10% by weight, especially 0.5 to 5% by weight, based on water and the inorganic dispersant, in an amount of 0.01 to 10% by weight, especially 0.1 to 5% by weight, based on the monomer. When the surface-active agent is used, its amount should not be one which may yield suspended particles of an emulsion size.

In the first embodiment, the polymerization temperature and time may be those which are known in suspension polymerization. Generally, it is sufficient to perform the polymerization at a temperature of 40° to 100° C. for 1 to 50 hours. The stirring of the reaction system may be carried out under mild condition so that a homogeneous reaction proceeds as a whole. To prevent inhibition of polymerization by oxygen, the polymerization may be carried out in the reaction system purged with an inert gas such as nitrogen.

In the second embodiment, the polymerization may be carried out, for example, by using a suspension polymerization apparatus of the type shown in FIG. 1. As shown in FIG. 1, an ultrasonic vibrator 2 is secured to the bottom of a sealable polymerization vessel 1 and connected to an ultrasonic generator 3. A water-jacket 4 is provided around the polymerization vessel 1 for temperature adjustment. A stirring mechanism 5 and a temperature detecting mechanism 6 are disposed within the polymerization tank 1. A reflux condenser and a material feed vessel 8 are provided in the upper part of the polymerization vessel 1. Further, an inert gas feed line 9 is provided. First, the inside of the polymerization vessel 1 is purged with an inert gas such as nitrogen, and water containing the dispersant is fed into the polymerization vessel. Then, a starting mixture containing the monomer, the coloring agent, the radical initiator, etc. is fed from the material feed vessel 8.

While heated water is fed to the jacket 4, the polymerization system is heated. At the same time, the polymerization system is stirred, and ultrasonic waves are irradiated. For particle size adjustment, it is important to use ultrasonic vibrations with a frequency of 10 to 90 KHz, preferably 15 to 50 KHz, most preferably 20 to 30 KHz. The suitable output of the ultrasonic vibrations, which may vary depending upon the volume of the polymerization system, is generally 10 to 100 W, especially 30 to 200 W, per unit volume (liter). The direction of ultrasonic radiation is not particularly limited. It may be applied from the bottom of the polymerization vessel 1, or from the upper part or the side wall of the polymerization vessel. It may also be applied from the front surface of the polymerization vessel. Ultrasonic waves may be irradiated by applying the ultrasonic vibrator 2 directly to the polymerization vessel 1. Or the vibrator 2 is spaced a little from the polymerization vessel 1, and ultrasonic waves may be indirectly applied through water in the water jacket 4. Ultrasonic irradiation may be carried out continuously throughout the polymerization period, or intermittently at fixed time intervals.

The suitable polymerization temperature is generally 40° to 100° C., particularly 50° to 90° C., and the polymerization time, which may vary depending upon the type of the monomer, is preferably selected from the range of 2 to 20 hours as a period of time which completes the polymerization. Polymer formed In both the first and second embodiments, the polymerization products after the reactions are obtained in the form of particles in the aforesaid particle size range. The resulting particles are filtered, and as required, washed with water, etc. They are then dried to form colored particles for use as a toner.

As required, carbon black, hydrophobic silica, etc. are sprinkled on the colored particles to form a final toner.

According to this invention, toners having a particle size of 1 to 30 μm suitable for a toner application and a sharp particle size distribution are obtained by the polymerization processes. A particular advantage of this invention is that the resulting toner particles do not substantially contain emulsion-polymerized particles having a fine particle diameter. Another advantage is that the resulting toners have excellent flowability, do not scatter nor cause fogging, and these toners can be produced in very good yields.

The following examples illustrate the present invention more specifically.

EXAMPLE 1

| | |
|---|---|
| Styrene | 80 parts by weight |
| n-Butyl methacrylate | 20 parts by weight |
| Carbon black (Printex L, a product of Degussa Co.) | 5 parts by weight |
| Charge controlling agent (Spiron Black TRH, a product of Hodogaya Chemical Co., Ltd.) | 1 part by weight |
| Low-molecular-weight polypropylene wax (Viscol 550P a product of Sanyo Chemical Co., Ltd.) | 2 parts by weight |
| 2,2'-azobis-2,4-dimetylvaleronitrile (V-65, a product of Wako Pure Chemicals, Co., Ltd.) | 5 parts by weight |

A composition containing the above ingredients was added to 400 parts by weight of a 0.2% aqueous solution of sodium dodecysulfate (critical micelle concentration 0.25%), and the mixture was stirred at a stirring speed of 6000 rpm for 10 minutes by means of a T.K. autohomomixer (made by Tokushu Kika Kogyo K.K.) to suspend and disperse the composition.

The dispersion was put in a separable flask and stirred at 60 rpm in a stream of nitrogen and the monomers were polymerized at 60° C. for 6 hours. When the polymerization product was left to stand for a while, a precipitate formed. The supernatant liquid was clear. the supernatant liquid was removed by decantation, and the precipitate was dried to give 105 parts by weight of a toner having a particle diameter of 5 to 15 μm.

The resulting toner was loaded into a copying machine (DC-1001 made by Mita Industrial Co., Ltd.), and 1000 copies were produced. The resulting images were clear without fogging, and toner scattering was only little.

EXAMPLE 2

| | |
|---|---|
| Styrene | 80 parts by weight |
| n-Butyl methacrylate | 20 parts by weight |
| Permanent Red FNG (a product of Sanyo Color Works, Ltd ) | 8 parts by weight |
| Charge controlling agent (Bontron E-82, a product of Orient Chemical Co.) | 1 part by weight |
| Low-molecular-weight polypropylene wax (Viscol 550P, a product of Sanyo Chemical Co.) | 2 parts by weight |
| Lauryl peroxide (a product of Wako Pure Chemicals, Co., Ltd.) | 3 parts by weight |

The above ingredients were well mixed and added to 400 parts by weight of a 0.03% aqueous solution of sodium dodecylbenzenesulfonate (critical micelle concentration less than 0.04%) together with 4 parts by weight of calcium tertiary phosphate. The mixture was stirred at a stirring speed of 8000 rpm for 10 minutes by a T.K. autohomomixer to suspend and disperse the above ingredients. The dispersion was subjected to polymerization by the same operation as in Example 1. Calcium tertiary phosphate was dissolved and removed by dilute hydrochloric acid, and the reaction mixture was filtered and dried to obtain 108 parts by weight of a toner having a particle diameter of 5 to 15 μm.

The resulting toner was loaded into the same copying machine as described in Example 1 and a copying test was conducted. Clear images were obtained.

COMPARATIVE EXAMPLE 1

Polymerization was carried out by the same method as in Example 1 except that dimethyl 2,2'-azobisisobutyrate (V-601, a product of Wako Pure Chemicals, Co., Ltd.) was used instead of 2,2'-azobis-2,4-dimethylvaleronitrile, and the polymerization temperature was changed to 70° C. When the polymerization product was left to stand for a while, a black precipitate formed. In the supernatant liquid, many polymer particles, less than 1 μm in size, containing no coloring agent occurred and rendered the liquid hazy. The supernatant liquid was removed by decantation, and the precipitate was dried. Only 84 parts by weight of a toner having a particle diameter of 5 to 15 μm was obtained.

The resulting toner was loaded into the same copying machine as described in Example 1, and a copying test was conducted. The resulting images had a low density and fogging occurred. Vigorous toner scattering occurred within the copying machine.

COMPARATIVE EXAMPLE 2

Polymerization was carried out by the same method as in Example 1 except that the concentration of the aqueous solution of sodium dodecylsulfate was changed to 0.5%. When the polymerization product was left to stand for a while, a black precipitate formed. In the supernatant liquid, many polymer particles, less than 1 μm in size, containing no coloring agent occurred and rendered the liquid hazy. The supernatant liquid was removed by decantation, and the precipitate was dried. Only 90 parts by weight of a toner having a particle diameter of 5 to 15 μm was obtained.

The resulting toner was loaded into the same copying machine as used in Example 1, and a copying test was conducted. The resulting images had a low density, and fogging also occurred.

COMPARATIVE EXAMPLE 3

Polymerization was carried out in the same way as in Example 2 except that cumene hydroperoxide was used instead of lauryl peroxide. In the polymerization product, more fine particle composed only of the polymer and having a particle diameter of less than 1 μm existed than in Example 2, and rendered the product slightly hazy.

The polymerization product was washed with dilute hydrochloric acid, filtered, and dried. Only 85 parts by weight of a toner having a particle diameter of 5 to 15 μm was obtained.

The resulting toner was loaded into the same copying machine as described in Example 1, and a copying test was conducted. The resulting images had slight fogging.

EXAMPLE 3

| | |
|---|---|
| Styrene | 70 parts by weight |
| n-Butyl acrylate | 30 parts by weight |
| Carbon black (Printex L, a product of Degussa Co.) | 5 parts by weight |
| Charge controlling agent (Spiron Black TRH, a product of Hodogaya Chemical Co., Ltd.) | 2 parts by weight |
| Low-molecular-weight polypropylene wax (Viscol 550P, a product of Sanyo Chemical Co.) | 2 parts by weight |
| AIBN (a product of Wako Pure Chemicals, Co., Ltd.) | 3 parts by weight |

A composition of the above ingredients was fully mixed and stirred at less than 50° C. for 30 minutes under ultrasonic irradiation. The mixture was put in a polymerization vessel of the type shown in FIG. 1 holding 700 parts by weight of 2 wt. % partially saponified polyvinyl alcohol, and stirred by an ordinary stirring vane at such a speed (50 rpm) as not to permit settlement of the particles. While irradiating ultrasonic waves with an output of 200 W by an ultrasonic irradiating device (made by Ultrasonic Wave Industry Co., Ltd.), the polymerization system was heated to 70° C. At this time, the ultrasonic vibrator 2 was not contacted directly with the polymerization vessel, but spaced slightly from the vessel, and ultrasonic radiation was applied indirectly via water in the water jacket 4. Thirty minutes later, the monomeric composition was divided into droplets having a size of about 10 m. The polymerization was completed in 6 hours. The polymerization product was allowed to setle, separated, filtered, washed and dried to obtain a toner. No adhesion of the polymer to the inner wall of the polymerization vessel and the stirrer was observed.

The particle diameter of the resulting toner was measured by a Coulter counter. It was found that the toner had an average particle diameter of 10.5 μm, and a very sharp particle size distribution with the proportion of particles having a size in the range of 5 to 15 μm being 90% of the entire particles. The toner had a Wardel's practical sphericity of 0.95 to 1.0 and showed excellent flowability.

The resulting toner was mixed with a ferrite carrier (a product of Japan Iron Powder Co., Ltd.) having a size of 150/300 mesh to form a mixture having a toner concentration of 4.5%. The amount of charge on the mixture measured by a blow-off charge measuring device was −18° C./g.

The resulting two-component developer was loaded into a copying machine (DC-111, made by Mita Industrial Co., Ltd.), and a copying test was conducted. The resulting images were free from fogging, and had good gradation and a good degree of blackness. When the toner images were fixed at a fixing temperature of 170° to 180° C., the ratio of fixation was as good as 98%. Wrapping about the fixation rollers and an offset phenomenon were not observed.

EXAMPLE 4

| | |
|---|---|
| Styrene | 70 parts by weight |
| n-Butyl methacrylate | 30 parts by weight |
| Phthalocyanine Blue (Chanine Blue 6-314, a product of Sanyo Color Works, Ltd.) | 5 parts by weight |
| Charge controlling agent (Bontron E-84, a product of Orient Chemical Co.) | 2 parts by weight |
| Low-molecular-weight polypropylene wax (Viscol 550P, a product of Sanyo Chemical Co., Ltd.) | 2 parts by weight |
| Lauroyl peroxide (a product of Wako Pure Chemicals, Co., Ltd.) | 3 parts by weight |

The above ingredients were charged into a reaction vessel of the type shown in FIG. 1, and stirred by a paddle stirring vane at less than 60° C. for 20 minutes at such a speed as not to permit settlement of the particles (50 rpm) while ultrasonic waves with a frequency of 20 KHz were applied with an output of 60 W. In irradiating the ultrasonic waves, the vibrator 2 was contacted directly with the reaction vessel.

Separately, 2 parts by weight of tricalcium phosphate was dispersed in 800 parts by weight of water. The dispersion was heated to 70° C., and put in the resulting slurry. Thereafter, tricalcium phosphate was removed by hydrochloric acid, and the product was filtered and washed with water fully, and dried to form a toner. No adhesion of the polymer to the inner wall of the polymerization vessel and the stirrer was noted.

The particle diameter of the toner was measured by a Coulter counter. It was found that the toner had an average particle diameter of 8.8 μm and had a very sharp particle size distribution. The toner had a Wardel practical sphericity of 0.95 to 1 and showed excellent flowability.

The toner was mixed with a ferrite carrier (made by TDK Co.) having size of 250/350 mesh to form a mixture having a toner concentration of 9.9%. The amount of charge on the mixture, measured by a blow-off charge measuring device, was −18° C./g. The distribution of charge on the mixture, measured by a parallel flat plate method, was sharp.

The toner was loaded into a copying machine (DC-323Z, made by Mita Industrial Co., Ltd.), and a copying test was conducted. The resulting images were free from fogging and had good gradation and a good degree of blackness. The images were also sharp with no brush mark. When the toner images were fixed at a fixing temperature of 170° to 180° C., the ratio of fixing was as good as 98%. Wrapping about the fixation rollers and an offset phenomenon were not observed.

COMPARATIVE EXAMPLE 3

Polymerization was carried out in the same way as in Example 3 except that the ultrasonic waves irradiated had a frequency of 400 KHz. There was hardly any adhesion of the polymer to the inner wall of the polymerization vessel and to the stirrer. But the resulting polymer had an average particle diameter of 900 μm and could not be used as a toner.

COMPARATIVE EXAMPLE 4

Polymerization was carried out by the same method as in Example 3 except that the ultrasonic waves were not irradiated and the stirring was carried out by an ordinary stirrer at a speed of 1500 rpm. Since some agglomeration occurred, the agglomerated particles were removed by using a 100-mesh nylo mesh. The dry weight of the agglomerated particles which did not pass through the nylon mesh was 5.3% based on the charged composition. The polymer adhered to the inner wall of the polymerization vessel and the stirrer. The dry weight of the adhering polymer corresponded to 8.2% based on the charged composition. The amount of the toner obtained was only 8.6% based on the charged starting materials, and the toner had an average particle diameter of as large as 36 μm.

COMPARATIVE EXAMPLE 5

Polymerization was carried out in the same way as in Example 4 except that the ultrasonic waves were not irradiated, and the stirring was carried out by using an ordinary stirrer at a stirring speed of 1500 rpm. Since some agglomeration occurred, the agglomerated particles were removed by a 100-mesh nylon mesh. The dry weight of the agglomerated particles which did not pass the nylon mesh corresponded to 10.5% of the charged materials. The polymer adhered both to the inner wall of the polymerization vessel, and to the stirrer. The amount of the adhering polymer corresponded to 7.8% based on the charged starting materials. The amount of the final toner obtained was 81.6% based on the charged materials. The toner had an average particle diameter of as large as 38 μm.

What is claimed is:

1. A process for producing an electrophotographic toner which comprises suspending at least one monomer capable of forming a fixing resin and a coloring agent in water and polymerizing the suspended monomer particles in the presence of a radical initiator to form colored toner particles, wherein said radical initiator has a solubility in water at 25° C. of not more than 0.05 g/100 cc and the suspension polymerization is carried out in the presence of a surface-active agent, as a suspension stabilizer, in a concentration lower than the critical micelle concentration.

2. The process of claim 1 wherein the surface-active agent is an anionic surface-active agent.

3. The process of claim 1 wherein the polymerization of the suspended particles of the monomer is carried out so that the resulting toner particles has a particle diameter of 1 to 30 μm.

* * * * *